Nov. 10, 1942.     R. F. FARRIS     2,301,389
APPARATUS FOR CEMENTING WELLS
Filed Aug. 22, 1940
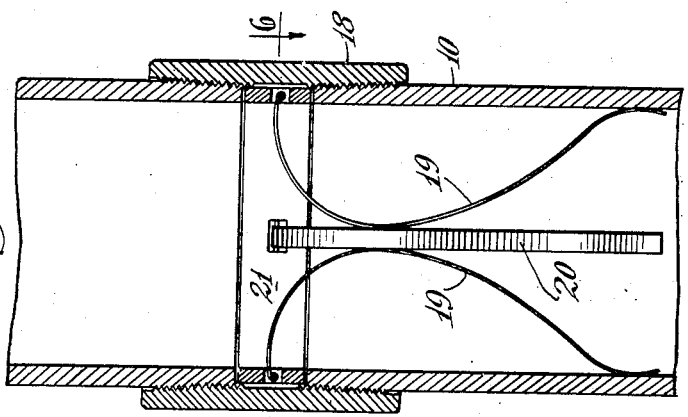
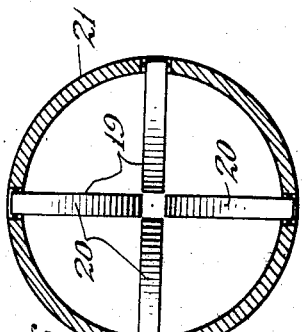
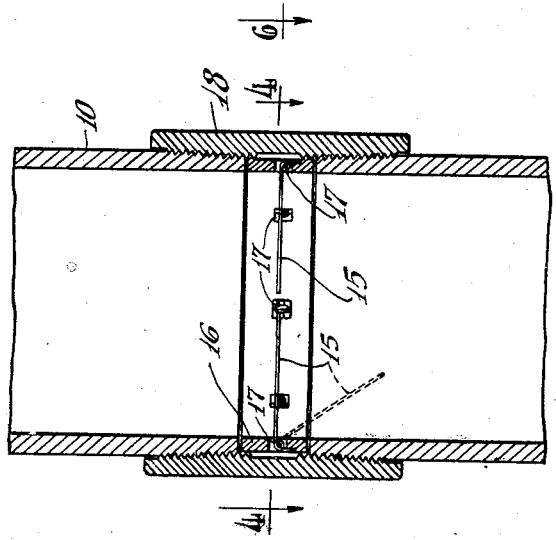
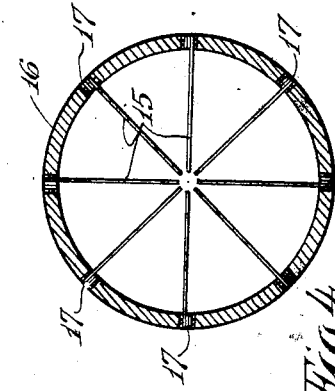
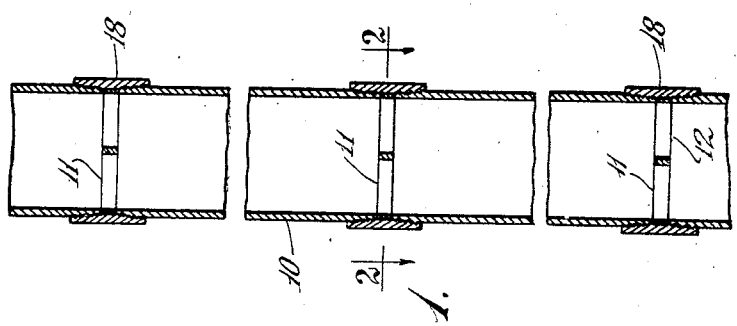
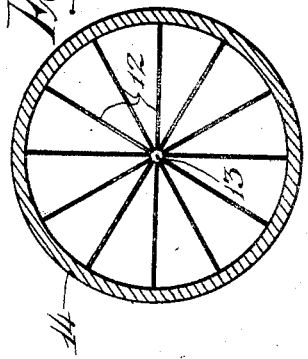
Inventor:
Riley Floyd Farris
By Everett A. Johnson
Attorney Patented Nov. 10, 1942

2,301,389

UNITED STATES PATENT OFFICE 2,301,389

APPARATUS FOR CEMENTING WELLS

Riley Floyd Farris, Tulsa, Okla., assignor to Stanolind Oil and Gas Company, Tulsa, Okla., a corporation of Delaware Application August 22, 1940, Serial No. 353,641

6 Claims. (Cl. 166—1)

This invention relates to an apparatus employed in the cementing of wells. More particularly my invention provides an apparatus for dispersing thick gels formed in cement slurries.

It has been generally assumed that the thin slurries of oil well cements flowed through the casing with a turbulent motion and that the slurries remained uniformly mixed to a low consistency. Recent investigations, however, have shown that the cement slurry, in the course of the cementing operation, gels to a thick mass which moves as a plug through the casing. It has been observed that the slurry forms an initial gel that is reversible to an apparent fluid state if subjected to shearing action but if the slurry is not disturbed the unstable gel will gradually progress on to the initial set. In a cementing operation the danger lies in the possibility that the unstable gel will progress to the stable gel or initial set and flow as a plug before placement of the slurry is completed. This condition is quite undesirable since it favors poor mud displacement, channeling, and weakness in the set cement. Cement cores taken from wells while drilling out the plug show that where the plug flow phenomenon existed, unsoundness usually prevails.

Therefore, it is an object of my invention to provide an apparatus for placing cement whereby the slurry remains uniform and fluid by dispersing the thick initial gels or by preventing the formation of such gels within the well casing. I attain this and other objects, which will become apparent hereinafter, by providing a plurality of shearing devices at vertically spaced points along substantial lengths of the casing. These devices may be incorporated in the casing collars, or may be disposed between lengths of the casing, as shown, or within special casing sections.

In the drawing, which forms a part of this specification:

Figure 1 is a vertical transverse section through a well casing string incorporating one embodiment of my invention;

Figure 2 is a horizontal section of the particular device shown between casing sections in Figure 1;

Figure 3 is a vertical section of another modification of my cementing apparatus and Figure 4 is a horizontal section taken along the line 4—4 in Figure 3; and Figures 5 and 6 are corresponding views of a third modification of the invention.

Referring to these figures and particularly to Figure 1, I have found that if the cement slurry is kept in a constant state of shear while being pumped into the well, the localized gel formation can be overcome. Hence, I provide the casing string 10 with a plurality of inwardly projecting blades 11 or the like adapted to subject the cement slurry to repeated shearing at vertically spaced intervals. This reduces the tendency to form gels and disperses any gels that do form.

Figures 2 to 6 inclusive illustrate various forms of the shear devices. Figure 2, for example, shows a shearing plate with narrow, straight blades 12 extending from hub or center 13 to the annular member 14. This plate is made of drillable material, such as Bakelite and is designed to be collected and carried to the bottom of the well by the top plug.

Figures 3 and 4 show an embodiment of my invention designed to operate with the two-plug method of cementing. Thin spring steel fingers 15 extending radially from ring 16 have narrow knife-like edges in the path of the flowing cement. The fingers 15 terminate in coil springs 17 which in turn are anchored in ring 16. As described above the assembly is placed at spaced points between sections of the casing. Likewise the blades or fingers 15 may be carried directly by the coupling or collar 18. The blades 15 are adapted to deflect in either direction to allow passage of any object within the well after which the blades assume a position effective in dispersing the gel.

Figures 5 and 6 illustrate a third modification of my invention wherein a plurality of flexible steel blades 19 with the broad faces 20 in the path of the cement extend from the ring 21 in the general direction of the flow of cement. A solid object such as a cementing plug can easily pass through the device by forcing the springs down and out flat against the casing.

In following my invention, a plurality of gel dispersing devices are placed in the casing string at vertically spaced points as the casing string is assembled. This is accomplished by placing, one dispersing device within the coupling 18 and on top of the uppermost section of the part of the string already assembled, and screwing the next casing section into the coupling.

I prefer to use at least four or five of these gel dispersing devices spaced more or less uniformly throughout the length of the casing. In many instances a much larger number of these devices is desirable. They can be spaced several casing lengths apart. Thus spacing of from 120 feet to 1200 feet are suitable, the wider spacing being used only when the well is deep and when the cementing operation is accomplished very rapidly.

After the casing has been lowered to position in the hole, cement is pumped in and caused to travel upwardly between the casing and sides of the well. Often when cement is introduced into deep well casings, it develops localized gel formations which have an ultimately adverse effect on the properties of the cement after setting. However, as the cement passes the successive plates or spring blades, the slurry is placed in a state of shear throughout substantial lengths of the casing string and the undesirable effect of the gels is overcome.

In a single plug cementing operation the plate shown in Figure 2 can be used advantageously. It is constructed of drillable material having properties which permit the cementing plug to collect and carry the drillable plates to the bottom of the well. The modifications shown in Figures 3, 4, 5 and 6 can be used in either a one- or two-plug operation, the blades being flexible enough to permit passage of the plug or other solid object but rigid enough to subject the slurry to a shearing action.

It is apparent from the above that I have provided simple means for improving the cementing of wells whereby localized gels are overcome and plug flow is avoided.

While I have shown preferred forms of my invention, it is to be understood that various changes may be made in the construction by those skilled in the art without departing from the spirit of my invention as defined by the claims.

I claim:

1. An apparatus for cementing a well comprising a well casing assembly, and a plurality of inwardly projecting means carried by said well casing assembly at a plurality of longitudinally spaced points, said means being constructed and arranged to subject a cement slurry flowing through said well casing assembly to shear, and for passage of a cementing plug through said well casing assembly.

2. An apparatus for cementing a well comprising a well casing, and a plurality of shear means located at longitudinally spaced points within said well casing for conditioning a cement slurry flowing therein, each of said means extending across the flow area of said well casing and being adapted to yield to the passage of a cementing plug through said casing.

3. An apparatus for cementing a well comprising a well casing and a plurality of means within said casing for conditioning a cement slurry flowing therein, said means being flexible and adapted to permit passage of solid objects.

4. In an apparatus for cementing a well, means within a well casing adapted for maintaining a cement slurry in a state of shear, said means comprising an annular supporting member and a plurality of flexible blades projecting inwardly from said annular member.

5. An apparatus for cementing a well comprising in combination a well casing, and a plurality of shearing means arranged at longitudinally spaced points within said well casing for conditioning a cement slurry flowing therein, each of said means comprising a plurality of yieldable elements normally extending into the flow area of said well casing.

6. In an apparatus for cementing a well, means adapted to be placed within a well casing for subjecting a cement slurry to shear, said means comprising an annular supporting member and a multiplicity of shear-imparting members yieldably projecting inwardly from said annular member and adapted to extend normally into the flow area of said well casing.

RILEY FLOYD FARRIS.